US012609987B2

(12) United States Patent
Ye et al.

(10) Patent No.: US 12,609,987 B2
(45) Date of Patent: Apr. 21, 2026

(54) DATA STORAGE CONTROL METHOD, DEVICE AND STORAGE MEDIUM

(71) Applicants: Beijing Volcano Engine Technology Co., Ltd., Beijing (CN); Lemon Inc., Grand Cayman (KY)

(72) Inventors: Jintao Ye, Singapore (SG); Wei Zhang, Beijing (CN); Bo Zhao, Beijing (CN); Binbin Chen, Beijing (CN); Zuzhi Chen, Singapore (SG); Kaixiong Ma, Singapore (SG); Yong Tian, Beijing (CN); Wei Feng, Beijing (CN); Kang Zhang, Beijing (CN); Tieying Zhang, Los Angeles, CA (US); Jianjun Chen, Los Angeles, CA (US)

(73) Assignees: Beijing Volcano Engine Technology Co., Ltd., Beijing (CN); Lemon Inc., Grand Cayman (KY)

( * ) Notice: Subject to any disclaimer, the term of this patent is extended or adjusted under 35 U.S.C. 154(b) by 53 days.

(21) Appl. No.: 18/821,422

(22) Filed: Aug. 30, 2024

(65) Prior Publication Data

US 2025/0211642 A1 Jun. 26, 2025

(30) Foreign Application Priority Data

Dec. 20, 2023 (CN) .......................... 202311768158.9

(51) Int. Cl.
*H04L 67/1097* (2022.01)
(52) U.S. Cl.
CPC .............................. *H04L 67/1097* (2013.01)
(58) Field of Classification Search
CPC .................................................. H04L 67/1097
See application file for complete search history.

(56) References Cited

U.S. PATENT DOCUMENTS

| | | | |
|---|---|---|---|
| 10,334,044 B1 | 6/2019 | Bigman et al. | |
| 10,824,751 B1 | 11/2020 | Kurian | |

(Continued)

FOREIGN PATENT DOCUMENTS

| | | |
|---|---|---|
| CN | 102135963 A | 7/2011 |
| CN | 105245405 A | 1/2016 |

(Continued)

OTHER PUBLICATIONS

Registration Notice received from Chinese patent application No. 202311768158.9 mailed on Mar. 3, 2025, 5 pages (1 pages English Translation and 4 pages Original Copy).

(Continued)

*Primary Examiner* — Kostas J Katsikis

(57) ABSTRACT

A data storage control method, a device, and a storage medium are provided. The method includes: constructing an equipment room allocation model for a distributed storage system based on a dependency relationship between storage objects in the distributed storage system, the equipment room allocation strategy is used to indicate a target equipment room allocated to the storage object in the distributed storage system, and the migration evaluation result is used to indicate overheads caused by data transition processing of migration from an original equipment room to the target equipment room for storage; determining, based on the equipment room allocation model, an equipment room allocation strategy corresponding to a minimum migration evaluation result as a target equipment room allocation strategy; and performing data migration on the distributed storage system based on the target equipment room allocation strategy.

20 Claims, 5 Drawing Sheets

Construct an equipment room allocation model for a distributed storage system based on a dependency relationship between storage objects in the distributed storage system, where the equipment room allocation model is used to output a corresponding migration evaluation result based on an equipment room allocation strategy, the equipment room allocation strategy is used to indicate a target equipment room allocated to the storage object in the distributed storage system, and the migration evaluation result is used to indicate overheads caused by data transition processing of migration from an original equipment room to the target equipment room for storage — S201

Invoke the equipment room allocation model to determine, based on a migration evaluation result corresponding to each equipment room allocation strategy, an equipment room allocation strategy corresponding to a minimum migration evaluation result as a target equipment room allocation strategy — S202

Perform data migration on the distributed storage system based on the target equipment room allocation strategy — S203

(56)          References Cited

U.S. PATENT DOCUMENTS

| | | |
|---|---|---|
| 2013/0185229 A1 | 7/2013 | Naga et al. |
| 2013/0275697 A1 | 10/2013 | Van Kempen et al. |
| 2016/0306849 A1 | 10/2016 | Curino et al. |
| 2018/0103084 A1 | 4/2018 | Auvenshine et al. |
| 2019/0138638 A1 | 5/2019 | Pal et al. |
| 2021/0224099 A1 * | 7/2021 | Luo ........................... G06F 8/63 |
| 2022/0019366 A1 | 1/2022 | Freilich et al. |
| 2022/0318072 A1 * | 10/2022 | Li ........................... H04L 67/60 |

FOREIGN PATENT DOCUMENTS

| | | |
|---|---|---|
| CN | 111258755 A | 6/2020 |
| CN | 112965957 A | 6/2021 |
| CN | 114153822 A | 3/2022 |
| CN | 115543965 A | 12/2022 |
| CN | 115982101 A | 4/2023 |
| CN | 117130979 A | 11/2023 |
| CN | 117149063 A | 12/2023 |
| JP | 2018-081497 A | 5/2018 |
| WO | WO-2017114178 A1 * | 7/2017 | ............ G06F 3/067 |
| WO | 2018/177107 A1 | 10/2018 | |
| WO | WO-2019001021 A1 * | 1/2019 | ......... G06F 11/1464 |
| WO | 2022/076856 A1 | 4/2022 | |
| WO | 2023/077750 A1 | 5/2023 | |

OTHER PUBLICATIONS

Office action received from Japanese patent application No. 202311768158.9 mailed on May 31, 2024, 20 pages (9 pages English Translation and 11 pages Original Copy).

Wenei, "Analysis on Data Migration Optimization Strategy of Distributed Cloud Storage System", Shanxi Vocational and Technical College, vol. 5, No. 1, 2017, pp. 1-3.

Yonglin et al., "Energy-efficient strategy for data migration and merging in Storm", Journal on Communications, vol. 40, No. 12, Dec. 2019, pp. 1-18.

Zhang et al., "Improved Migration Strategy of Mobile Agent Based on Itinerary Graph", Computer Application Research, 2007, pp. 1-4.

* cited by examiner

| 1 | 0 | 0 |
|---|---|---|
| 0 | 1 | 0 |
| 0 | 0 | 1 |
| 1 | 0 | 0 |
| 0 | 1 | 0 |

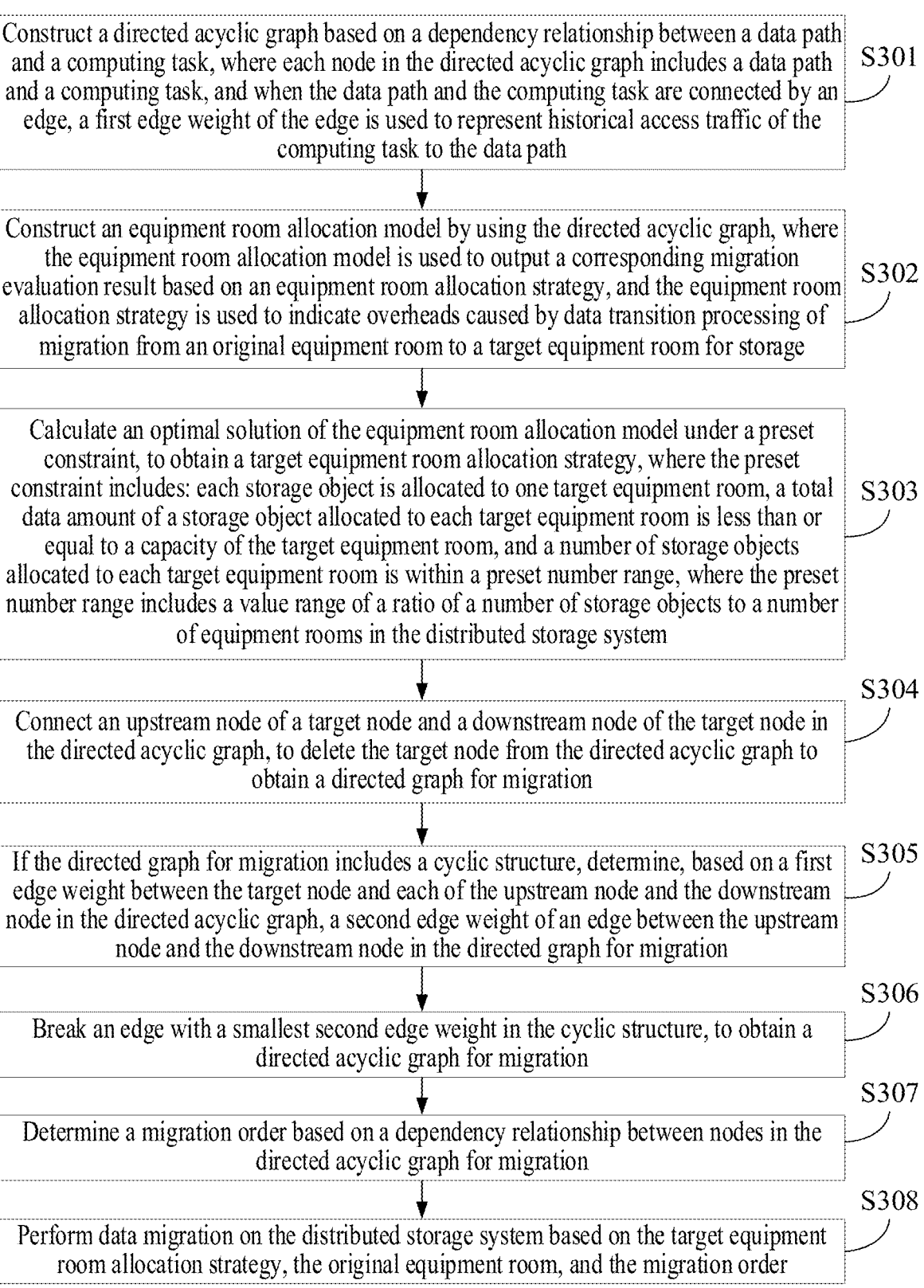

Construct a directed acyclic graph based on a dependency relationship between a data path and a computing task, where each node in the directed acyclic graph includes a data path and a computing task, and when the data path and the computing task are connected by an edge, a first edge weight of the edge is used to represent historical access traffic of the computing task to the data path   S301

Construct an equipment room allocation model by using the directed acyclic graph, where the equipment room allocation model is used to output a corresponding migration evaluation result based on an equipment room allocation strategy, and the equipment room allocation strategy is used to indicate overheads caused by data transition processing of migration from an original equipment room to a target equipment room for storage   S302

Calculate an optimal solution of the equipment room allocation model under a preset constraint, to obtain a target equipment room allocation strategy, where the preset constraint includes: each storage object is allocated to one target equipment room, a total data amount of a storage object allocated to each target equipment room is less than or equal to a capacity of the target equipment room, and a number of storage objects allocated to each target equipment room is within a preset number range, where the preset number range includes a value range of a ratio of a number of storage objects to a number of equipment rooms in the distributed storage system   S303

Connect an upstream node of a target node and a downstream node of the target node in the directed acyclic graph, to delete the target node from the directed acyclic graph to obtain a directed graph for migration   S304

If the directed graph for migration includes a cyclic structure, determine, based on a first edge weight between the target node and each of the upstream node and the downstream node in the directed acyclic graph, a second edge weight of an edge between the upstream node and the downstream node in the directed graph for migration   S305

Break an edge with a smallest second edge weight in the cyclic structure, to obtain a directed acyclic graph for migration   S306

Determine a migration order based on a dependency relationship between nodes in the directed acyclic graph for migration   S307

Perform data migration on the distributed storage system based on the target equipment room allocation strategy, the original equipment room, and the migration order   S308

DATA STORAGE CONTROL METHOD, DEVICE AND STORAGE MEDIUM

CROSS-REFERENCE TO RELATED APPLICATIONS

The present disclosure claims priority of the Chinese Patent Application No. 202311768158.9 filed on Dec. 20, 2023, the disclosure of which is incorporated herein by reference in its entirety as part of the present application.

TECHNICAL FIELD

Embodiments of the present disclosure relate to the field of distributed cluster technologies, and in particular, to a data storage control method, a device, and a storage medium.

BACKGROUND

In a distributed storage system, a plurality of storage devices are provided, and a storage object of each storage device may include data and a task. Expansion of the distributed storage system includes vertical expansion and horizontal expansion. Vertical expansion is to migrate data in all the storage devices of the distributed storage system as a whole to an equipment room with a sufficient capacity. Horizontal expansion is to migrate part of data from an original equipment room to a newly added equipment room based on a multi-equipment room deployment solution.

In the prior art, a migration strategy needs to be determined in the above horizontal expansion solution, to establish a correspondence between a storage object and an equipment room, so that a storage object may be migrated to a corresponding equipment room based on the correspondence. The migration strategy may be flexibly set based on a capacity of an equipment room and a service requirement.

However, the above technical solution has the problem of high overheads.

SUMMARY

Embodiments of the present disclosure provide a data storage control method and a device, which can reduce overheads caused by data migration.

According to a first aspect, an embodiment of the present disclosure provides a data storage control method. The method includes:

constructing an equipment room allocation model for a distributed storage system based on a dependency relationship between storage objects in the distributed storage system, where the equipment room allocation model is used to output a corresponding migration evaluation result based on an equipment room allocation strategy, the equipment room allocation strategy is used to indicate a target equipment room allocated to the storage object in the distributed storage system, and the migration evaluation result is used to indicate overheads caused by data transition processing of migration from an original equipment room to the target equipment room for storage;

invoking the equipment room allocation model to determine, based on a migration evaluation result corresponding to each equipment room allocation strategy, an equipment room allocation strategy corresponding to a minimum migration evaluation result as a target equipment room allocation strategy; and

2 performing data migration on the distributed storage system based on the target equipment room allocation strategy.

According to a second aspect, an embodiment of the present disclosure provides a data storage control apparatus. The apparatus includes:

a function construction module configured to construct an equipment room allocation model for a distributed storage system based on a dependency relationship between storage objects in the distributed storage system, where the equipment room allocation model is used to output a corresponding migration evaluation result based on an equipment room allocation strategy, the equipment room allocation strategy is used to indicate a target equipment room allocated to the storage object in the distributed storage system, and the migration evaluation result is used to indicate overheads caused by data transition processing of migration from an original equipment room to the target equipment room for storage;

a target strategy determining module configured to invoke the equipment room allocation model to determine, based on a migration evaluation result corresponding to each equipment room allocation strategy, an equipment room allocation strategy corresponding to a minimum migration evaluation result as a target equipment room allocation strategy; and a data migration module configured to perform data migration on the distributed storage system based on the target equipment room allocation strategy.

According to a third aspect, an embodiment of the present disclosure provides an electronic device. The electronic device includes at least one processor and a memory.

The memory stores computer-executable instructions.

The at least one processor executes the computer-executable instructions stored in the memory, to cause the electronic device to implement the method in the first aspect.

According to a fourth aspect, an embodiment of the present disclosure provides a computer-readable storage medium storing computer-executable instructions that, when executed by a processor, cause a computing device to implement the method in the first aspect.

According to a fifth aspect, an embodiment of the present disclosure provides a computer program for implementing the method in the first aspect.

The embodiments of the present disclosure provide the data storage control method and the device. The method includes: constructing the equipment room allocation model for the distributed storage system based on the dependency relationship between the storage objects in the distributed storage system, where the equipment room allocation model is used to output the corresponding migration evaluation result based on the equipment room allocation strategy, the equipment room allocation strategy is used to indicate the target equipment room allocated to the storage object in the distributed storage system, and the migration evaluation result is used to indicate the overheads caused by data transition processing of migration from the original equipment room to the target equipment room for storage; invoking the equipment room allocation model to determine, based on the migration evaluation result corresponding to each equipment room allocation strategy, the equipment room allocation strategy corresponding to the minimum migration evaluation result as the target equipment room allocation strategy; and performing data migration on the distributed storage system based on the target equipment room allocation strategy. The equipment room allocation model is constructed for the distributed storage system before migration. The equipment room allocation model is used to output the corresponding migration evaluation result based on the equipment room allocation strategy. Therefore, an optimal solution of the equipment room allocation model can be calculated to obtain the target equipment room allocation strategy corresponding to minimum overheads caused by data migration. In this way, overheads caused by data migration performed after comparing the target equipment room allocation strategy with the original equipment room can be minimized.

BRIEF DESCRIPTION OF DRAWINGS

In order to more clearly describe the technical solutions in the embodiments of the present disclosure or in the prior art, the accompanying drawings for describing the embodiments or the prior art will be briefly described below. Apparently, the accompanying drawings in the description below show some embodiments of the present disclosure, and persons of ordinary skill in the art may still derive other accompanying drawings from these accompanying drawings without creative efforts.

FIG. 6 is a flowchart of steps of another data storage control method according to an embodiment of the present disclosure;

DETAILED DESCRIPTION

In order to make the objects, technical solutions and advantages of embodiments of the present disclosure clearer, the technical solutions in the embodiments of the present disclosure will be described clearly and completely below with reference to the accompanying drawings in the embodiments of the present disclosure. Apparently, the embodiments described are some of, rather than all of, the embodiments of the present disclosure. All the other embodiments obtained by persons of ordinary skill in the art based on the embodiments of the present disclosure without any creative effort shall fall within the scope of protection of the present disclosure.

Figure 1:
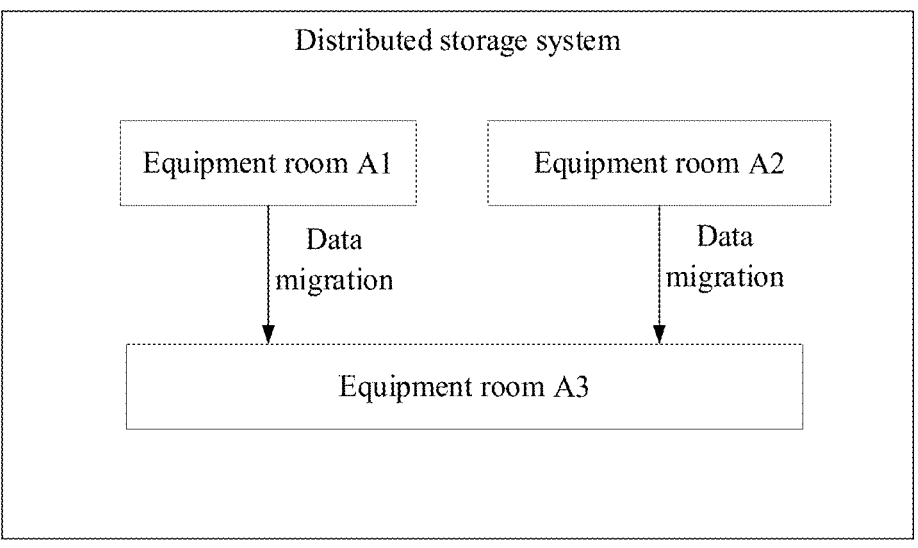
FIG. 1 is a schematic diagram of a structure of a distributed storage system according to an embodiment of the present disclosure.

The embodiments of the present disclosure are applicable to expansion of a distributed storage system, so as to migrate data from an original equipment room to a newly added equipment room after expansion. FIG. 1 is a schematic diagram of a structure of a distributed storage system according to an embodiment of the present disclosure. As shown in FIG. 1, the distributed storage system may include three equipment rooms A1, A2, and A3. The equipment rooms A1 and A2 are original equipment rooms before horizontal expansion, and the equipment room A3 is a newly added equipment room after horizontal expansion. Therefore, part of data in the original equipment rooms A1 and A2 may need to be migrated to the newly added equipment room A3.

However, in the prior art, data migration is usually performed flexibly based on a service requirement and capacities of the original equipment room and the newly added equipment room. This can solve the problem of an insufficient equipment room capacity, but may result in higher overheads in data migration.

In order to solve the above technical problem, according to the embodiments of the present disclosure, an equipment room allocation model is constructed for the distributed storage system before migration. The equipment room allocation model is used to output a corresponding migration evaluation result based on an equipment room allocation strategy. The migration evaluation result indicates overheads caused by data transition processing of migration from the original equipment room to the target equipment room for storage. Therefore, a target equipment room allocation strategy corresponding to a minimum migration evaluation result may be determined based on the equipment room allocation model. In this way, when data migration is performed after comparing the target equipment room allocated based on the target equipment room allocation strategy with the original equipment room, overheads in data migration can be minimized.

It should be noted that the distributed storage system in the embodiments of the present disclosure may be any system with a storage function, and a storage object in the distributed storage system may be of any type. For example, when the storage object is a file, the distributed storage system may be a Hadoop distributed file system (HDFS), a Ceph file system (CephFS), a Gluster file system (GlusterFS), etc. The embodiments of the present disclosure may be described subsequently using the HDFS as an example, and principles of the other distributed storage systems are similar.

The technical solutions in the embodiments of the present disclosure and how the technical solutions of the present disclosure solve the above technical problem are described below in detail with specific embodiments. The following several specific embodiments may be combined with each other, and details about same or similar concepts or processes may not be described in some embodiments again. The embodiments of the present disclosure are described below with reference to the accompanying drawings.

Figure 2:
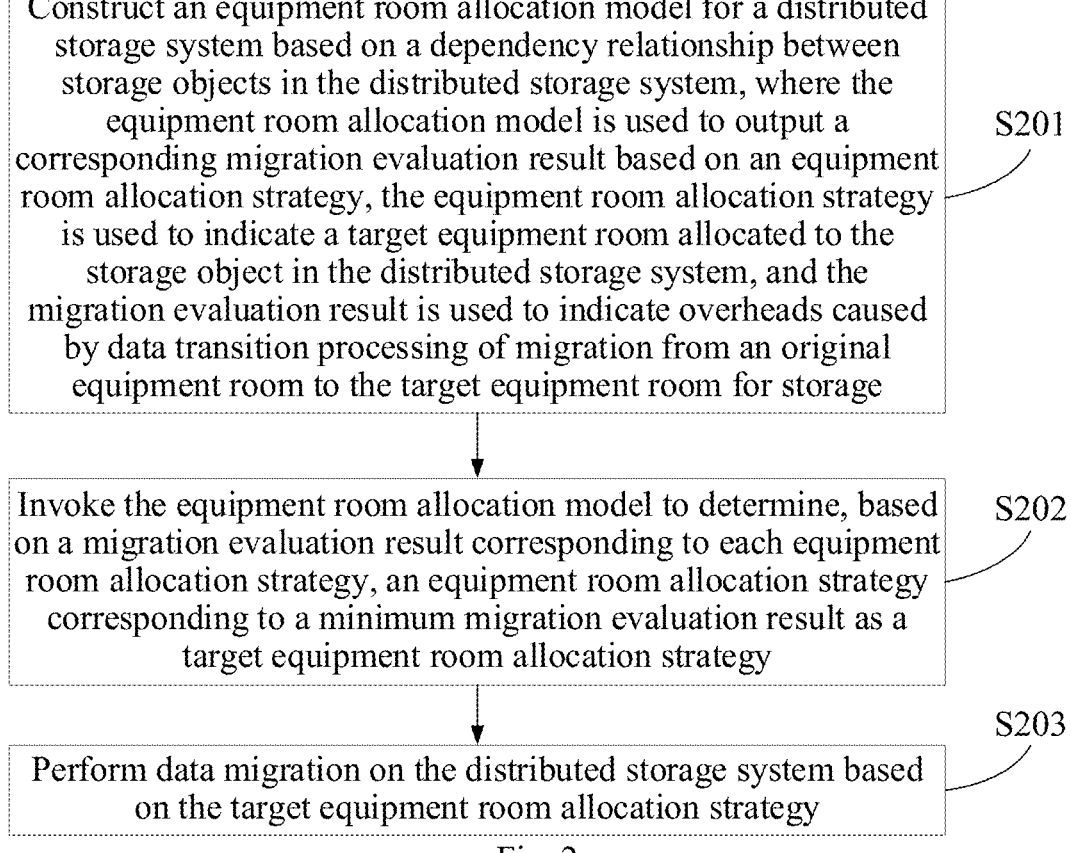
FIG. 2 is a flowchart of steps of a data storage control method according to an embodiment of the present disclosure.

FIG. 2 is a flowchart of steps of a data storage control method according to an embodiment of the present disclosure. As shown in FIG. 2, the data storage control method includes the following steps.

S201: Construct an equipment room allocation model for a distributed storage system based on a dependency relationship between storage objects in the distributed storage system, where the equipment room allocation model is used to output a corresponding migration evaluation result based on an equipment room allocation strategy, the equipment room allocation strategy is used to indicate a target equipment room allocated to the storage object in the distributed storage system, and the migration evaluation result is used to indicate overheads caused by data transition processing of migration from an original equipment room to the target equipment room for storage.

The migration evaluation result may include overheads caused by the data transition processing in any dimension, including at least one of the following: migration costs corresponding to the distributed storage system and corresponding cross-equipment room access traffic generated after equipment room allocation is performed based on the equipment room allocation strategy. The migration costs include total costs required for migrating the storage object in the distributed storage system from the original equipment room corresponding to the storage object to the target equipment room corresponding to the storage object in the equipment room allocation strategy for storage. In this way, minimizing the migration evaluation result means minimizing the migration costs and the cross-equipment room access traffic. Therefore, the equipment room allocation strategy corresponding to the minimum migration evaluation result can ensure as much as possible that interdependent storage objects are in one equipment room, avoiding traffic forwarding between different equipment rooms, i.e., reducing cross-equipment room access. This helps reduce access duration, improve access efficiency, and reduce migration costs.

The above interdependent storage objects mainly refer to a data path and a computing task that depends on the data path, indicating that the computing task needs to read data from the data path or write data to the data path. When the data path and the computing task that depends on the data path are not in a same equipment room, the computing task invokes the data path across equipment rooms, to generate a cross-equipment room procedure.

The above migration costs may also be understood as migration costs required during switching from an original equipment room allocation strategy to the equipment room allocation strategy. The cross-equipment room access traffic includes access traffic between at least two storage objects located in different equipment rooms but dependent on each other. The original equipment room allocation strategy may be understood as being used to indicate an original equipment room corresponding to each storage object. The above target equipment room may be understood as an equipment room corresponding to each storage object indicated in the equipment room allocation strategy, and the original equipment room is a current equipment room corresponding to the storage object when the above equipment room allocation model is constructed.

The storage object may include, but is not limited to: a data path and a computing task. The data path is used to represent a path for storing data, and uniquely represents a data table. For example, the data path may be a Hive data table or an HDFS path.

The equipment room allocation strategy may be used to indicate a target equipment room allocated to each storage object in the distributed storage system. For example, the distributed storage system includes three equipment rooms A1, A2, and A3, which are used to store five storage objects: B1, B2, B3, B4, and B5. In this case, the equipment room allocation strategy may be: target equipment rooms corresponding to the storage objects B1, B2, B3, B4, and B5 are A1, A2, A3, A1, and A2, respectively.

Figures 3, 4:
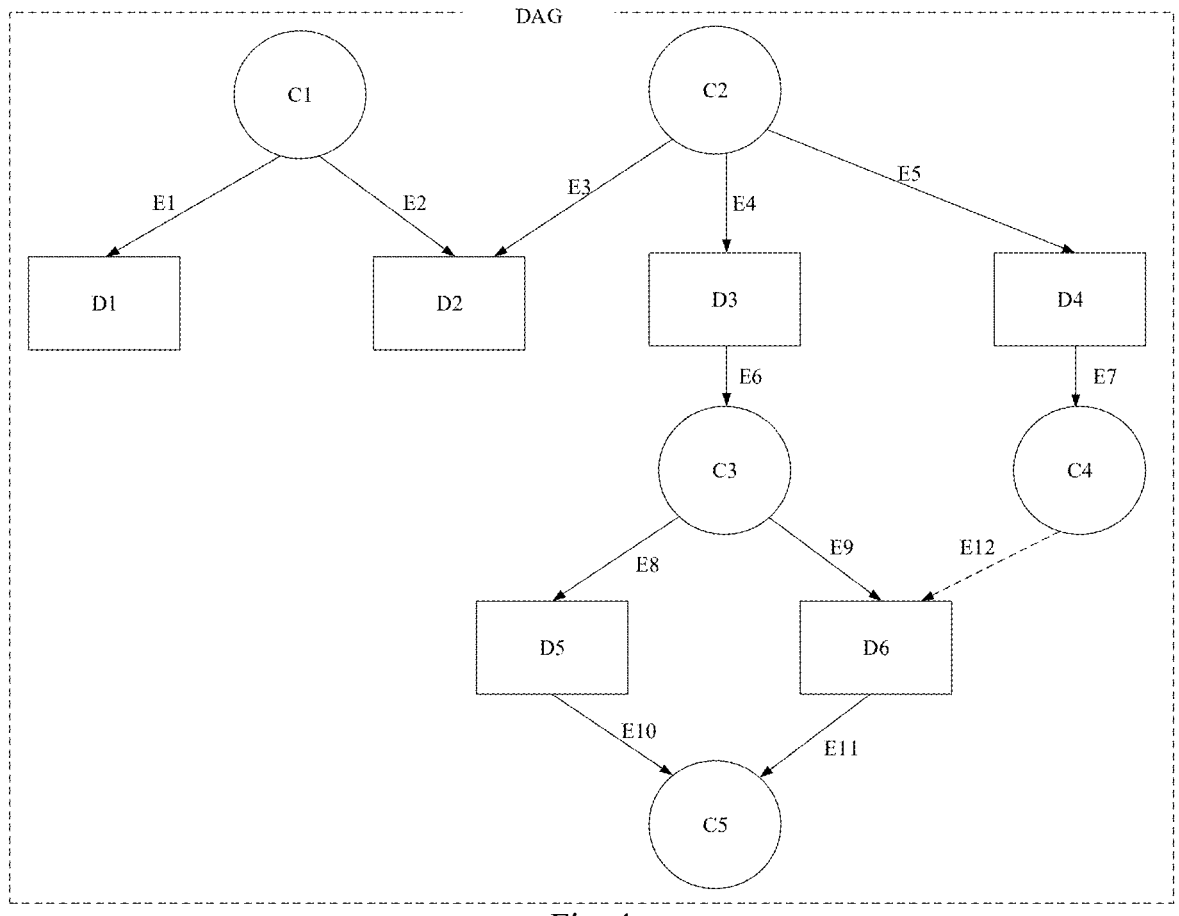
FIG. 3 is a schematic diagram of a representation manner of an equipment room allocation strategy according to an embodiment of the present disclosure.
FIG. 4 is a schematic diagram of a structure of a DAG according to an embodiment of the present disclosure.

The above equipment room allocation strategy may be represented by a set of values. FIG. 3 is a schematic diagram of a representation manner of an equipment room allocation strategy according to an embodiment of the present disclosure. As shown in FIG. 3, a set of values in three rows and five columns are used to represent correspondences between three storage objects and five equipment rooms. An equipment room corresponding to each storage object is a target equipment room allocated to the storage object based on the equipment room allocation strategy. An $i^{th}$ row and a $j^{th}$ column are used to indicate whether an $i^{th}$ storage object is allocated to a $j^{th}$ equipment room, that is, whether the $j^{th}$ equipment room is a target equipment room for the $i^{th}$ storage object. It can be learned from FIG. 3 that 1 exists in only the first column in the first row, which indicates that the first storage object B1 corresponds to the first equipment room A1; 1 exists in only the second column in the second row, which indicates that the second storage object B2 corresponds to the second equipment room A2; 1 exists in only the third column in the third row, which indicates that the third storage object B3 corresponds to the third equipment room A3; 1 exists in only the first column in the fourth row, which indicates that the fourth storage object B4 corresponds to the first equipment room A1; and 1 exists in only the second column in the fifth row, which indicates that the fifth storage object B5 corresponds to the second equipment room A2.

It may be understood that the above equipment room allocation strategy may be represented in the form of an array or a matrix, which is not limited in this embodiment of the present disclosure.

According to this embodiment of the present disclosure, the equipment room allocation model may be constructed for the distributed storage system based on a structure and a historical access status of the distributed storage system. There may be two implementations for a process of constructing the equipment room allocation model.

In a first implementation of constructing the equipment room allocation model, related information of the distributed storage system may be determined first. Then, some related information of the above distributed storage system is used as a parameter of a migration cost calculation model and a parameter of a cross-equipment room traffic calculation model, respectively. Finally, the migration cost calculation model and the cross-equipment room traffic calculation model are combined into the equipment room allocation model.

In a second implementation of constructing the equipment room allocation model, the equipment room allocation model may be constructed by constructing a directed acyclic graph. Specifically, first, the directed acyclic graph (DAG) is constructed based on a dependency relationship between a data path and a computing task, where each node in the DAG includes a data path and a computing task, and when the data path and the computing task are connected by an edge, a first edge weight of the edge is used to represent historical access traffic of the computing task to the data path. Then, the equipment room allocation model is constructed by using the DAG.

Each node in the DAG represents one storage object in the distributed storage system, that is, one node is a data path or a computing task. Therefore, the number of nodes in the DAG is consistent with the number of storage objects in the distributed storage system. When a computing task accesses a data path, a node corresponding to the computing task and a node corresponding to the data path in the DAG are connected by an edge, and a first edge weight of the edge represents historical access traffic of the computing task to the data path.

FIG. 4 is a schematic diagram of a structure of a DAG according to an embodiment of the present disclosure. As shown in FIG. 4, there are five nodes of data paths C1, C2, C3, C4, and C5 and five nodes of computing tasks D1, D2, D3, D4, D5, and D6. Historical access traffic of the computing task D1 to the data path C1 is E1. Historical access traffic of the computing task D2 to the data paths C1 and C2 is E2 and E3 respectively. Historical access traffic of the computing task D3 to the data paths C2 and C3 is E4 and E6 respectively. Historical access traffic of the computing task D4 to the data paths C2 and C4 is E5 and E7 respectively. Historical access traffic of the computing task D5 to the data paths C3 and C5 is E8 and E10 respectively. Historical access traffic of the computing task D6 to the data paths C3 and C5 is E9 and E11 respectively.

It should be noted that the computing task is used to read data from a data path in an upstream node to perform computing on the data, and write result data obtained through computing to a data path in a downstream node. Therefore, access traffic of the computing task to the data path in the upstream node may be understood as an amount of data read by the computing task from the data path, and access traffic of the computing task to the data path in the downstream node may be understood as an amount of data written by the computing task to the data path.

It can be learned from the DAG shown in FIG. 4 above that the DAG may clearly represent dependency relationships between the data paths and the computing tasks in the distributed storage system, thereby facilitating faster and more accurate construction of the equipment room allocation model.

In the process of constructing the equipment room allocation model by using the above DAG, the number of nodes where the data paths in the DAG are located, the number of nodes where the computing tasks are located, a first edge weight of each edge, etc. may be used as parameters of the equipment room allocation model.

In this embodiment of the present disclosure, a parameter required by the equipment room allocation model may include a constant and a variable. The constant may include a computing task index set Njob, a data path index set Ndata, a node set V, an edge set F, an edge weight set E, the number K of equipment rooms, a balance control constant, an original equipment room index Xi(init) of the $i^{th}$ storage object, a size Si of the $i^{th}$ storage object, a capacity Cj of the $j^{th}$ equipment room, and migration costs for a single storage object. The migration costs for a single storage object include migration costs Pjob for a single computing task and migration costs Pdata for a single data path. The above variable includes an equipment room allocation strategy variable Xij, a storage object migration variable MGRi, and an equipment room differentiation variable Yii'.

The computing task index set Njob includes indexes of all computing tasks in the distributed storage system, and an index i of any computing task point belongs to Njob.

The data path index set Ndata includes indexes of all data paths in the distributed storage system, and an index i' of any data path belongs to Ndata.

The node set V includes all nodes in the DAG that correspond to the storage objects in the distributed storage system. The node set V includes the nodes where the computing tasks are located and the nodes where the data paths are located. The node set V is a union of the computing task index set Njob and the data path index set Ndata.

The edge set F includes all edges in the DAG, and the edges are used to represent the dependency relationships between the computing tasks and the data paths in the DAG. When a computing task has ever accessed a data path, there is an edge between the computing task and the data path to connect the computing task and the data path. Any edge <i, i'> in any edge set F is used to represent an edge between an $i^{th}$ computing task and an $i'^{th}$ data path, where i belongs to the computing task index set Njob, and i' belongs to the data path index set Ndata.

The edge weight set E includes first edge weights of all the edges in the DAG. A first edge weight between the $i^{th}$ computing task and the $i'^{th}$ data path is represented by Eii'.

The number K of equipment rooms is a total number of all equipment rooms after expansion, including equipment rooms existing before equipment room expansion and equipment rooms newly added during expansion.

The balance control constant is used to control balanced distribution of data in all the equipment rooms after migration, to avoid excessive or insufficient data in some equipment rooms. There may be two balance control constants: $\beta_{max}$ and $\beta_{min}$, which are used to control an amount of data in each equipment room after migration to satisfy the following formula (1):

$$\beta \min \cdot \frac{Num}{K} \leq Nj \leq \beta \max \cdot \frac{Num}{K} \tag{1}$$

It may be understood that Num is the number of storage objects in the distributed storage system. Therefore, $$\frac{Num}{K}$$

may be understood as a number of storage objects corresponding to each equipment room when all the storage objects in the distributed storage system are evenly distributed to K equipment rooms. Certainly, since a storage space occupied by a computing task is usually small, whether the computing tasks are balanced in the equipment rooms may be ignored, and focuses are on only whether the data paths are balanced. In this case, Num is set to the number of data paths in the distributed storage system.

The original equipment room index Xi(init) of the $i^{th}$ storage object is used to indicate an index of an original equipment room for the $i^{th}$ storage object before the current data migration.

The size Si of the $i^{th}$ storage object is used to represent a data amount of the $i^{th}$ storage object.

The capacity Cj of the $j^{th}$ equipment room is used to represent a maximum amount of data that may be stored in the $j^{th}$ equipment room.

The migration costs for a single storage object are used to represent costs required for migrating one storage object. The costs may be measured from multiple aspects such as time, computational complexity, occupied resources, etc. Considering that migration costs for a data path are different from those for a computing task, the migration costs for a single storage object may be classified as the migration costs Pdata for a single data path and the migration costs Pjob for a single computing task.

The equipment room allocation strategy variable Xij is used to indicate whether the $i^{th}$ storage object is allocated to the $j^{th}$ equipment room, is a Boolean variable, and is valued to 1 or 0. When the equipment room allocation strategy variable Xij=1, it indicates that the $i^{th}$ storage object is allocated to the $j^{th}$ equipment room. When the equipment room allocation strategy variable Xij=0, it indicates that the $i^{th}$ storage object is not allocated to the $j^{th}$ equipment room. Therefore, the equipment room allocation strategy may be represented by multiple equipment room allocation strategy variables Xij. The number of equipment room allocation strategy variables Xij for the storage equipment rooms is a product of the number of storage objects in the distributed storage system and the number K of equipment rooms after expansion.

The storage object migration variable MGRi is used to indicate whether the $i^{th}$ storage object is migrated, is a Boolean variable, and is valued to 1 or 0. When the storage object migration variable MGRi is 1, it indicates that the $i^{th}$ storage object is migrated. When the storage object migration variable MGRi is 1, it indicates that the $i^{th}$ storage object is not migrated.

The equipment room differentiation variable Yii' is used to indicate whether the $i^{th}$ storage object and an $i'^{th}$ storage object are allocated to a same target equipment room, is a Boolean variable, and is valued to 1 or 0. When the equipment room differentiation variable Yii' is 1, it indicates that the $i^{th}$ storage object and the $i'^{th}$ storage object are not allocated to the same target equipment room. When the equipment room differentiation variable Yii' is 0, it indicates that the $i^{th}$ storage object and the $i'^{th}$ storage object are allocated to the same target equipment room.

After the above variables and constants are set, the constants and the variables may be used as parameters of the equipment room allocation model, to obtain the equipment room allocation model. The equipment room allocation model includes migration costs and cross-equipment room access traffic.

The migration costs included in the migration evaluation result are related to the migration costs for a single storage object and a number of storage objects to be migrated. The number of storage objects to be migrated is related to the original equipment room and the equipment room allocation strategy. It may be understood that the equipment room allocation strategy indicates a target equipment room allocated to each storage object, so that an original equipment room for a storage object may be compared with a target equipment room in the equipment room allocation strategy that corresponds to the storage object. When the original equipment room is different from the target equipment room, it may be determined that the storage object is a storage object to be migrated. Conversely, when the original equipment room is the same as the target equipment room, it may be determined that the storage object is not a storage object to be migrated.

For example, referring to the equipment room allocation strategy shown in FIG. 3, target equipment rooms respectively corresponding to the first storage objects B1, B2, B3, B4, and B5 are the first equipment room A1, the second equipment room A2, the third equipment room A3, the first equipment room A1, and the second equipment room A2. When original equipment rooms respectively corresponding to the first storage objects B1, B2, B3, B4, and B5 are the first equipment room A1, A2, A2, A1, and A2, B3 is a storage object to be migrated.

It should be noted that the migration costs included in the migration evaluation result are positively correlated with the above number of storage objects to be migrated and the above migration costs for a single storage object. In other words, as the number of storage objects to be migrated increases, and/or the migration costs for a single storage object increase, the migration costs included in the equipment room allocation model also increase.

The cross-equipment room access traffic included in the migration evaluation result is related to a first edge weight corresponding to a cross-equipment room node group in the directed acyclic graph. The cross-equipment room node group includes a node where a computing task is located and a node where a data path is located in the directed acyclic graph, which are connected by an edge. The computing task and the data path in the cross-equipment room node group correspond to different target equipment rooms in the equipment room allocation strategy.

The cross-equipment room access traffic included in the migration evaluation result is positively correlated with the first edge weight. In other words, as the first edge weight increases and/or a number of cross-equipment room node groups increases, the cross-equipment room access traffic increases.

The above cross-equipment room node group is used to indicate that the computing task and the data path that have a dependency relationship are located in different target equipment rooms, and therefore there is cross-equipment room access. Specifically, any edge may be obtained from the DAG first to determine a computing task and a data path that are connected by the edge, and then target equipment rooms corresponding to the computing task and the data path in the equipment room allocation strategy are determined. For example, when the target equipment rooms corresponding to the computing task and the data path are equipment room A1 and equipment room A2 respectively, cross-equipment room access is formed for the computing task and the data path.

Based on the above analysis process, a specific formula for the above equipment room allocation model is given below. The equipment room allocation model Func may be represented as the following formula (2):

$$Func = Func1 + Func2 \tag{2}$$

Func1 and Func2 are cross-equipment room traffic respectively, and Func2 is the migration costs. For Func1, reference may be specifically made to the following formula (3) for Func1. For Func2, reference may be specifically made to the following formula (4).

$$Func1 = \sum_{<i,i'>\in F} Eii' \cdot Yii' \tag{3}$$

$$Func2 = Pjob \cdot \sum_{i \in Njob} MGRi + \sum_{i \in Ndata} MGRi \tag{4}$$

For the above formula (3), since Eii' represents the first edge weight between the $i^{th}$ computing task and the $i'^{th}$ data path, and Yii' is used to indicate whether the $i^{th}$ computing task and the $i'^{th}$ data path are allocated to the same target equipment room, a product of the Eii' and Eii' represents cross-equipment room access traffic between the $i^{th}$ computing task and the $i'^{th}$ data path that are not allocated to the same target equipment room. Furthermore, Func1 is used to represent corresponding cross-equipment room access traffic generated after equipment room allocation is performed based on an equipment room allocation strategy.

Yii' may be determined based on Xij in the equipment room allocation strategy. When Xij and Xi'j, both of which are valued to 1, have different values of j, Yii' is 1; or when Xij and Xi'j, both of which are valued to 1, have a same value of j, Yii' is 0. Therefore, Func1 may be understood as a function that is based on the equipment room allocation strategy and the first edge weight.

For the above formula (4), since MGRi is used to indicate whether the $i^{th}$ storage object is migrated, $$\sum_{i \in Njob} MGRi$$

is used to indicate the number of migrated computing tasks in all the computing tasks, and $$\sum_{i \in Ndata} MGRi$$

is used to indicate the number of migrated data paths in all the storage paths. Therefore, $$Pjob \cdot \sum_{i \in Njob} MGRi$$

is used to represent migration costs required for migrating a computing task, and $$Pdata \cdot \sum_{i \in Ndata} MGRi$$

is used to represent migration costs required for migrating a data path.

It may be understood that MGRi may be calculated by using the following formula:

$$MGRi = 1 - X_{i,Xi(init)} \qquad (5)$$

For the above formula (5), since Xi(init) is an index of an original equipment room for the $i^{th}$ storage object, $X_{i,Xi\ (init)}$ is used to indicate whether the $i^{th}$ storage object is allocated to the original equipment room for the storage object. It can be learned that MGRi may be determined based on the original equipment room and the equipment room allocation strategy, and therefore Func2 is a function that is based on the original equipment room and the equipment room allocation strategy.

It can be learned from the above descriptions that Func1 and Func2 are both functions that are based on the equipment room allocation strategy variable Xij, and thus the equipment room allocation model is a function that is based on Xij. Therefore, an optimal solution of the equipment room allocation model may be calculated to obtain Xij indicating whether each storage object is allocated to each equipment room, to form a target equipment room allocation strategy. In other words, an equipment room allocation strategy Xij corresponding to a minimum output of the equipment room allocation model is the target equipment room allocation strategy.

S202: Invoke the equipment room allocation model to determine, based on a migration evaluation result corresponding to each equipment room allocation strategy, an equipment room allocation strategy corresponding to a minimum migration evaluation result as the target equipment room allocation strategy.

Specifically, the optimal solution of the equipment room allocation model may be calculated to obtain the target equipment room allocation strategy, with an optimization goal of minimizing the above migration evaluation result.

The target equipment room allocation strategy is an equipment room allocation strategy corresponding to an optimal output of the equipment room allocation model. Optimal herein may include, but is not limited to: the migration evaluation result output by the equipment room allocation model is minimum and/or is less than or equal to a preset threshold. In other words, the target equipment room allocation strategy is an equipment room allocation strategy corresponding to cross-equipment room traffic and migration costs that are as low as possible or minimum.

Similar to the equipment room allocation strategy described above, the target equipment room allocation strategy herein is used to indicate an optimal target equipment room corresponding to each storage object.

In this embodiment of the present disclosure, a mixed-integer linear programming (MILP) technique is used to calculate the optimal solution of the above equipment room allocation model. Specifically, a mathematical programming solver, for example, Gurobi, Cplex, or another solver, may be invoked to calculate the optimal solution of the equipment room allocation model. The solver is not limited in this embodiment of the present disclosure.

It may be understood that since the migration evaluation result output by the equipment room allocation model includes the cross-equipment room traffic, a process of calculating the optimal solution of the above equipment room allocation model includes a process of minimizing the cross-equipment room traffic. Therefore, this process is equivalent to a process of clustering the storage objects based on the dependency relationships, to allocate a computing task and a storage path that depend on each other to a same equipment room as much as possible, to reduce cross-equipment room access.

In some implementations, to improve effects of equipment room allocation, the equipment room allocation strategy corresponding to the minimum migration evaluation result may be determined as the target equipment room allocation strategy based on the equipment room allocation model under a preset constraint. The preset constraint herein includes: each storage object is allocated to one target equipment room, a total data amount of a storage object allocated to each target equipment room is less than or equal to a capacity of the target equipment room, and a number of storage objects allocated to each target equipment room is within a preset number range. The preset number range includes a value range of a ratio of the number of storage objects to the number of equipment rooms in the distributed storage system.

The above constraint that each storage object is allocated to one equipment room may be understood as follows: For any $i^{th}$ storage object, there is only one value of j causing Xij=1, which indicates that the $i^{th}$ storage object is allocated to the $j^{th}$ equipment room, and other values of j all cause Xij=0. The above logic may also be represented by the following formula:

$$\sum_{j \in K} Xij = 1 \qquad (6)$$

Xij represents whether the $i^{th}$ storage object is allocated to the $j^{th}$ equipment room. When Xij=1, it indicates that the $i^{th}$ storage object is allocated to the $j^{th}$ equipment room, and the $j^{th}$ equipment room is a target equipment room for the $i^{th}$ storage object in the equipment room allocation strategy.

The constraint that the total data amount of storage objects allocated to each equipment room is less than or equal to the capacity of the equipment room may be understood as follows: For any $j^{th}$ equipment room, a sum of data amounts of storage objects allocated to the equipment room is less than or equal to a capacity $Cj$ of the equipment room, which may be specifically represented by the following formula:

$$\sum_{j \in K} Xij \cdot Si <= Cj \tag{7}$$

V is the node set in the DAG, and $Si$ is used to represent the size of the $i^{th}$ storage object.

The constraint that the number of storage objects allocated to each equipment room is within the preset number range may be understood as follows: For any $j^{th}$ equipment room, the number of storage objects allocated to the equipment room is within the preset number range. Specifically, the constraint may be represented by the above formula (1).

In summary, according to this embodiment of the present disclosure, each storage object may be controlled to be stored in one equipment room, to avoid data of a same storage object being distributed in different equipment rooms, which can improve query efficiency and management efficiency. A total data amount of data objects in each equipment room may also be controlled to be less than a capacity of the equipment room, to avoid a data loss. All the storage objects in the distributed storage system may also be controlled to be evenly distributed in different equipment rooms, which helps improve a balance.

In this embodiment of the present disclosure, when $Xij=1$, it indicates that the $i^{th}$ storage object is allocated to the $j^{th}$ equipment room, and the $j^{th}$ equipment room is the target equipment room for the $i^{th}$ storage object. In this case, there is further the following constraint:

$$Yii' \geq Xij - Xi'j \tag{8}$$

The above constraint (8) may be understood in two cases: $Yii'=1$ and $Yii'=0$.

When $Yii'=1$, the $i^{th}$ and $i'^{th}$ storage objects are allocated to different target equipment rooms. In this case, for a target equipment room for the $i^{th}$ storage object, $Xij=1$, and $Xi'j=0$, so that $Yii'=Xij-Xi'j$. For a target equipment room for the $i'^{th}$ storage object, $Xij=0$, and $Xi'j=1$, so that $Yii'>Xij-Xi'j$.

When $Yii'=0$, the $i^{th}$ and $i'^{th}$ storage objects are allocated to a same target equipment room. In this case, for the same target equipment room, $Xij=Xi'j=1$, and $Yii'=Xij-Xi'j$. For equipment rooms other than the same target equipment room, $Xij=Xi'j=0$, so that $Yii'=Xij-Xi'j$.

S203: Perform data migration on the distributed storage system based on the target equipment room allocation strategy.

Specifically, a target equipment room for each storage object in the target equipment room allocation strategy may be compared with an original equipment room corresponding to each storage object indicated in the original equipment room allocation strategy described above, to obtain a storage object for which an original equipment room and a target equipment room are different as a storage object to be migrated, for migration from the original equipment room to the target equipment room.

In some implementations, after one or more storage objects to be migrated are obtained, the storage objects may be migrated in any order. However, the dependency relationships between the storage objects are not considered in this implementation, which may cause access errors during a migration process. Therefore, a migration order may be determined based on the dependency relationships between the storage objects, to perform data migration. Specifically, the migration order may be determined first based on the directed acyclic graph, and then data migration may be performed on the distributed storage system based on the target equipment room allocation strategy, the original equipment room, and the migration order.

The migration order is determined based on the dependency relationship in the directed acyclic graph. Specifically, a storage object on which another storage object depends is migrated before a storage object that depends on another storage object. For example, as shown in FIG. 4, the storage object D3 depends on the storage object C2, and therefore the storage object D3 is migrated after the storage object C2 is migrated. Certainly, if two storage objects are not connected by an edge, a migration order of the two storage objects is not restricted.

After the migration order is determined, the storage object to be migrated may be determined based on the target equipment room allocation strategy and the original equipment room, to perform data migration in the migration order. This can avoid an access error during the migration process caused by the fact that a storage object on which another storage object depends is migrated first, and help ensure correct access during the migration process.

In this embodiment of the present disclosure, the target equipment room corresponding to each storage object may be determined from the target equipment room allocation strategy, to migrate all storage objects for which an original equipment room and a target equipment room are different. However, considering some special scenarios, some of the storage objects for which the original equipment room and the target equipment room are different may be migrated. Specifically, an upstream node of a target node in the DAG is connected to a downstream node of the target node, to delete the target node from the DAG to obtain a directed graph for migration and determine the migration order based on the directed graph for migration.

The target node may be a node that is set based on an actual scenario and where a storage object that does not need to be migrated is located, and may include one of the following: a node where a computing task is located and a node where a data path is located. For example, in practical applications, considering that the computing task occupies a small space and requires a complicated migration process, it is possible to migrate only the data path but not the computing task. Therefore, the node where the computing task is located may be used as the target node. Certainly, there are some other special scenarios in which the node where the data path is located may be used as the target node, so that the data path is not migrated.

The upstream node of the target node is a node on which the target node depends, and the downstream node of the target node is a node that depends on the target node. When a target node has both the upstream node and the downstream node, after the target node is deleted, the upstream node and the downstream node of the target node are connected. When the target node has no upstream node and/or downstream node, the above connection is not required after the target node is deleted.

Figure 5:
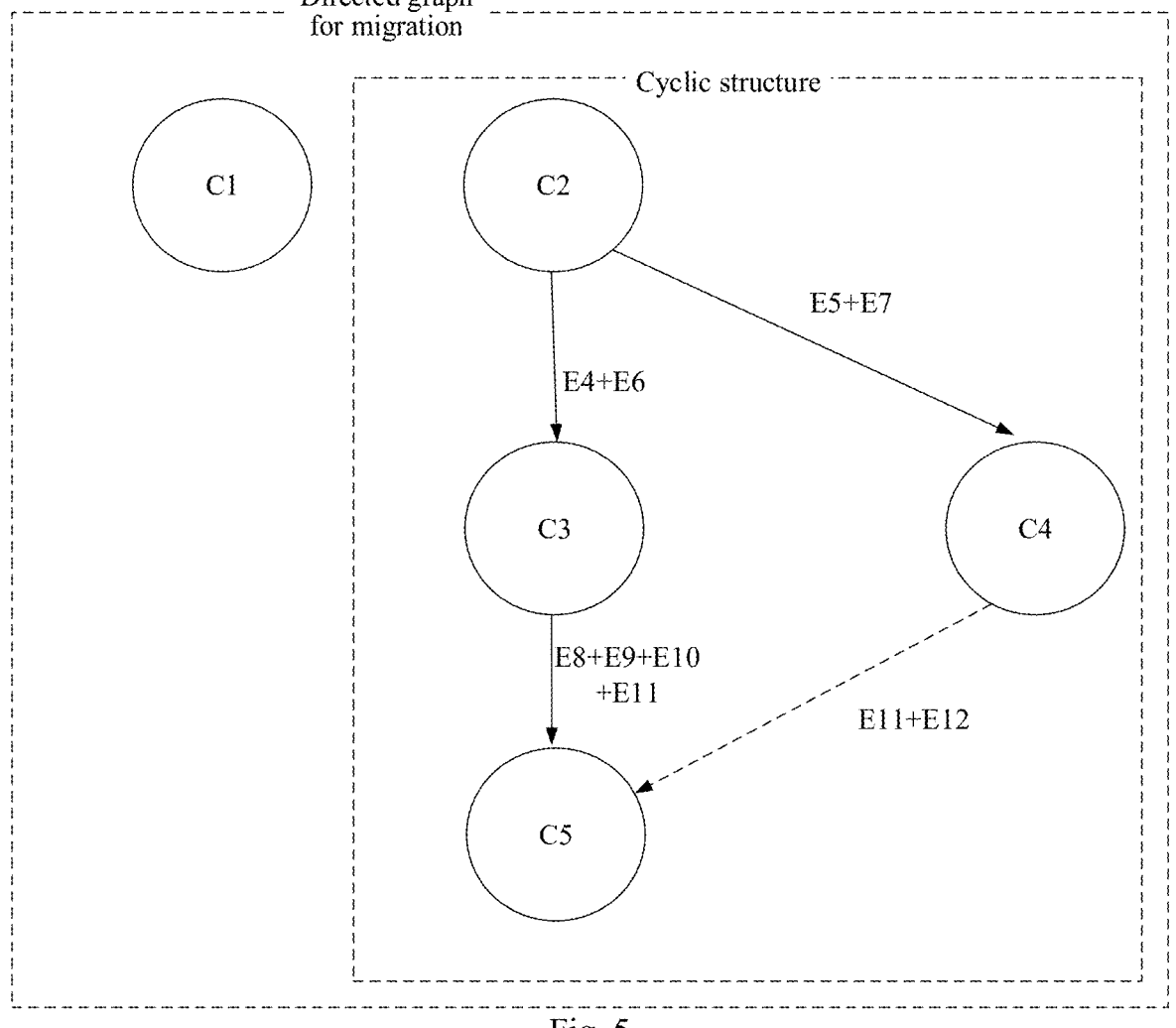
FIG. 5 is a schematic diagram of a structure of a directed graph for migration according to an embodiment of the present disclosure.

FIG. 5 is a schematic diagram of a structure of a directed graph for migration according to an embodiment of the present disclosure. FIG. 5 shows a directed graph for migration obtained by deleting the nodes where the computing tasks in the DAG shown in FIG. 4 are located. Since there is no node that depends on the nodes where the computing tasks D1 and D2 are located, the nodes where the computing tasks D1 and D2 are located in FIG. 4 are directly deleted, to obtain the node where the isolated data path C1 is located in FIG. 5. Since there is a node that depends on the node where the computing task D3 is located, after the node where the computing task D3 is located in FIG. 4 is deleted, it is necessary to connect the data path C3 that depends on the computing task D3 and the data path C2 on which the computing task D3 depends. Similarly, after the computing task D4 is deleted, the data path C2 and the data path C4 are connected, and after the computing tasks D5 and D6 are deleted, the data paths C3 and C5 are connected.

After the above directed graph for migration is obtained, the migration order may be determined based on the directed graph for migration. Similarly, the migration order is determined based on dependency relationships between nodes in the directed graph for migration, and details are not described herein again.

According to this embodiment of the present disclosure, the target node may be deleted for flexible data migration, so that the flexibility of migration can be improved to meet specific requirements of specific scenarios.

It can be learned from a generation process of the directed graph for migration that there may or may not be a cyclic structure after the target node is deleted. When there is no cyclic structure in the directed graph for migration, the migration order may be determined based on the dependency relationships between the nodes in the above directed graph for migration, to perform data migration. However, when there is a cyclic structure in the directed graph for migration, the cyclic structure needs to be opened. In other words, a specific edge in the cyclic structure may be broken, and the broken edge may be any edge. However, when the broken edge is an edge with a strong dependency relationship, a storage object on which another storage object depends may be migrated later, resulting in a plenty of access errors during the data migration process. Therefore, in this embodiment of the present disclosure, breaking an edge with a weak association in the cyclic structure is considered to avoid impact on access during data migration to the greatest extent.

Specifically, if the directed graph for migration includes the cyclic structure, a second edge weight of an edge between the upstream node and the downstream node in the directed graph for migration is determined based on a first edge weight between the target node and each of the upstream node and the downstream node in the directed acyclic graph. Then, an edge with a smallest second edge weight in the cyclic structure is broken to obtain a directed acyclic graph for migration. Finally, the migration order is determined based on the dependency relationship between the nodes in the directed acyclic graph for migration.

The second edge weight of the edge between the upstream node and the downstream node in the directed graph for migration is positively correlated with the first edge weight between the target node and each of the upstream node and the downstream node in the directed acyclic graph, and includes, but is not limited to: a sum, a weighted sum, or a value calculated in any other manner.

For example, when the target node D3 shown in FIG. 4 is deleted, a first edge weight E4 between the upstream node C2 and the target node D3 and a first edge weight E6 between the target node D3 and the downstream node C3 are added to obtain a second edge weight E4+E6 between the nodes C2 and C3 in FIG. 5.

Similarly, when the target node D4 shown in FIG. 4 is deleted, a first edge weight E5 between the upstream node C2 and the target node D4 and a first edge weight E7 between the target node D4 and the downstream node C4 are added to obtain a second edge weight E5+E7 between the nodes C2 and C4 in FIG. 5.

When the target node D5 shown in FIG. 4 is deleted, a first edge weight E8 between the upstream node C3 and the target node D5 and a first edge weight E10 between the target node D5 and the downstream node C5 are added to obtain a partial second edge weight E8+E10 between the nodes C3 and C5.

When the target node D6 shown in FIG. 4 is deleted, a first edge weight E9 between the upstream node C3 and the target node D6 and a first edge weight E11 between the target node D6 and the downstream node C5 are added to obtain another partial second edge weight E9+E11 between the nodes C3 and C5.

Finally, after D5 and D6 are deleted, a second edge weight between the nodes C3 and C5 is E8+E9+E10+E11 as shown in FIG. 5.

As shown in FIG. 4, if the computing task D6 depends on the data path C4, and historical access traffic of the computing task to the data path is E12, when the target node D6 is deleted, a connection edge between C4 and C5 shown in FIG. 5 may be obtained, and a corresponding second edge weight is E11+E12. In this case, the directed graph for migration has a cyclic structure. It is necessary to break an edge with a smallest second edge weight in the cyclic structure based on the second edge weights E4+E6, E5+E7, E+E9+E10+E11, and E11+E12. For example, when the second edge weight E11+E12 is the smallest, an edge corresponding to the second edge weight E11+E12 is broken.

The above directed graph for migration may be understood as a maximum weight spanning tree, in which a weight between connected storage objects is large. After the migration order is determined based on the above directed graph for migration, data migration may be performed. The data migration process may include three procedures: data preparation, duplicate migration, and effect follow-up.

Data preparation mainly involves obtaining the original equipment room for the storage object, a storage space occupied by the storage object, a cross-equipment room access status, etc., to evaluate a number of resources expected to be consumed by data migration.

The data migration process is mainly performed based on a capability of migrating a data duplicate to an equipment room, and an implementation principle is scanning duplicate distribution of all file blocks in all directories of the distributed storage system to determine whether each duplicate conforms to the target equipment room allocation strategy. If the duplicate conforms to the target equipment room allocation strategy, there is no need to duplicate or delete the duplicate. If the duplicate does not conform to the target equipment room allocation strategy, a missing duplicate is duplicated through a duplicate repair process, and a redundant duplicate that does not conform to the target equipment room allocation strategy is deleted using a corresponding duplicate deletion mechanism. In this way, directory-level redistribution of data in the equipment rooms may be implemented.

The above effect follow-up procedure is used to continuously monitor parameters such as cross-equipment room bandwidth consumption and a migration speed during the data migration process, to evaluate overall data migration effects.

FIG. 6 is a flowchart showing steps of another data storage control method according to an embodiment of the present disclosure. As shown in FIG. 6, the data storage control method may include the following steps.

S301: Construct a directed acyclic graph based on a dependency relationship between a data path and a computing task, where each node in the directed acyclic graph includes a data path and a computing task, and when the data path and the computing task are connected by an edge, a first edge weight of the edge is used to represent historical access traffic of the computing task to the data path.

S302: Construct an equipment room allocation model by using the directed acyclic graph, where the equipment room allocation model is used to output a corresponding migration evaluation result based on an equipment room allocation strategy, and the equipment room allocation strategy is used to indicate overheads caused by data transition processing of migration from an original equipment room to a target equipment room for storage.

S303: Calculate an optimal solution of the equipment room allocation model under a preset constraint, to obtain a target equipment room allocation strategy, where the preset constraint includes: each storage object is allocated to one target equipment room, a total data amount of a storage object allocated to each target equipment room is less than or equal to a capacity of the target equipment room, and a number of storage objects allocated to each target equipment room is within a preset number range, where the preset number range includes a value range of a ratio of a number of storage objects to a number of equipment rooms in the distributed storage system.

S304: Connect an upstream node of a target node and a downstream node of the target node in the directed acyclic graph, to delete the target node from the directed acyclic graph to obtain a directed graph for migration.

S305: If the directed graph for migration includes a cyclic structure, determine, based on a first edge weight between the target node and each of the upstream node and the downstream node in the directed acyclic graph, a second edge weight of an edge between the upstream node and the downstream node in the directed graph for migration.

S306: Break an edge with a smallest second edge weight in the cyclic structure, to obtain a directed acyclic graph for migration.

S307: Determine a migration order based on a dependency relationship between nodes in the directed acyclic graph for migration.

S308: Perform data migration on the distributed storage system based on the target equipment room allocation strategy, the original equipment room, and the migration order.

The order of steps S301 to S308 may be flexibly adjusted based on a mutual independence. For corresponding descriptions, reference may be made to the embodiment of the method shown in FIG. 2, and details are not described herein again.

Figure 7:
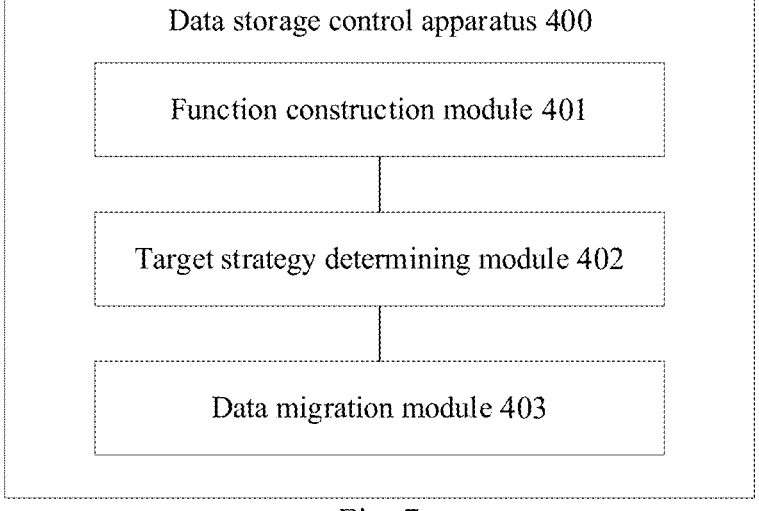
FIG. 7 is a block diagram of a structure of a data storage control apparatus according to an embodiment of the present disclosure.

Corresponding to the data storage control method of the above embodiments, FIG. 7 is a block diagram of a structure of a data storage control apparatus according to an embodiment of the present disclosure. For ease of illustration, only parts related to this embodiment of the present disclosure are shown. Referring to FIG. 7, the data storage control apparatus 400 includes:

a function construction module 401 configured to construct an equipment room allocation model for a distributed storage system based on a dependency relationship between storage objects in the distributed storage system, where the equipment room allocation model is used to output a corresponding migration evaluation result based on an equipment room allocation strategy, the equipment room allocation strategy is used to indicate a target equipment room allocated to the storage object in the distributed storage system, and the migration evaluation result is used to indicate overheads caused by data transition processing of migration from an original equipment room to the target equipment room for storage;

a target strategy determining module 402 configured to invoke the equipment room allocation model to determine, based on a migration evaluation result corresponding to each equipment room allocation strategy, an equipment room allocation strategy corresponding to a minimum migration evaluation result as a target equipment room allocation strategy; and a data migration module 403 configured to perform data migration on the distributed storage system based on the target equipment room allocation strategy.

Optionally, the migration evaluation result includes migration costs corresponding to the distributed storage system and corresponding cross-equipment room access traffic generated after equipment room allocation is performed based on the equipment room allocation strategy. The migration costs include total costs required for migrating the storage object in the distributed storage system from the original equipment room corresponding to the storage object to the target equipment room corresponding to the storage object in the equipment room allocation strategy for storage.

Optionally, the storage object includes a data path and a computing task. The function construction module 401 is further configured to:

construct a directed acyclic graph based on a dependency relationship between the data path and the computing task, where each node in the directed acyclic graph includes a data path and a computing task, and when the data path and the computing task are connected by an edge, a first edge weight of the edge is used to represent historical access traffic of the computing task to the data path; and construct the equipment room allocation model by using the directed acyclic graph.

Optionally, the migration costs are related to migration costs for ca single storage object and a number of storage objects to be migrated, and the number of storage objects to be migrated is related to the original equipment room and the equipment room allocation strategy.

The cross-equipment room access traffic is related to a first edge weight corresponding to a cross-equipment room node group in the directed acyclic graph. The cross-equipment room node group includes a node where a computing task is located and a node where a data path is located in the directed acyclic graph, which are connected by an edge. The computing task and the data path in the cross-equipment room node group correspond to different target equipment rooms in the equipment room allocation strategy.

Optionally, the target strategy determining module 402 is further configured to:

determine, based on the equipment room allocation model under a preset constraint, the equipment room allocation strategy corresponding to the minimum migration evaluation result as the target equipment room allocation strategy, where the preset constraint includes: each storage object is allocated to one target equipment room, a total data amount of a storage object allocated to each target equipment room is less than or equal to a capacity of the target equipment room, and a number of storage objects allocated to each target equipment room is within a preset number range, where the preset number range includes a value range of a ratio of a number of storage objects to a number of equipment rooms in the distributed storage system.

Optionally, the data migration module 403 is further configured to:

determine a migration order based on the directed acyclic graph; and perform data migration on the distributed storage system based on the target equipment room allocation strategy, the original equipment room, and the migration order.

Optionally, the data migration module 403 is further configured to:

connect an upstream node of a target node and a downstream node of the target node in the directed acyclic graph, to delete the target node from the directed acyclic graph to obtain a directed graph for migration; and determine the migration order based on the directed graph for migration.

Optionally, the data migration module 403 is further configured to:

if the directed graph for migration includes a cyclic structure, determine, based on a first edge weight between the target node and each of the upstream node and the downstream node in the directed acyclic graph, a second edge weight of an edge between the upstream node and the downstream node in the directed graph for migration;

break an edge with a smallest second edge weight in the cyclic structure, to obtain a directed acyclic graph for migration; and determine the migration order based on a dependency relationship between nodes in the directed acyclic graph for migration.

Optionally, the target node includes one of the following: a node where the computing task is located and a node where the data path is located.

The data storage control apparatus provided in this embodiment may be configured to perform the technical solution of the above method embodiment shown in FIG. 2. The implementation principles and technical effects thereof are similar, which are not repeated in this embodiment.

Figure 8:
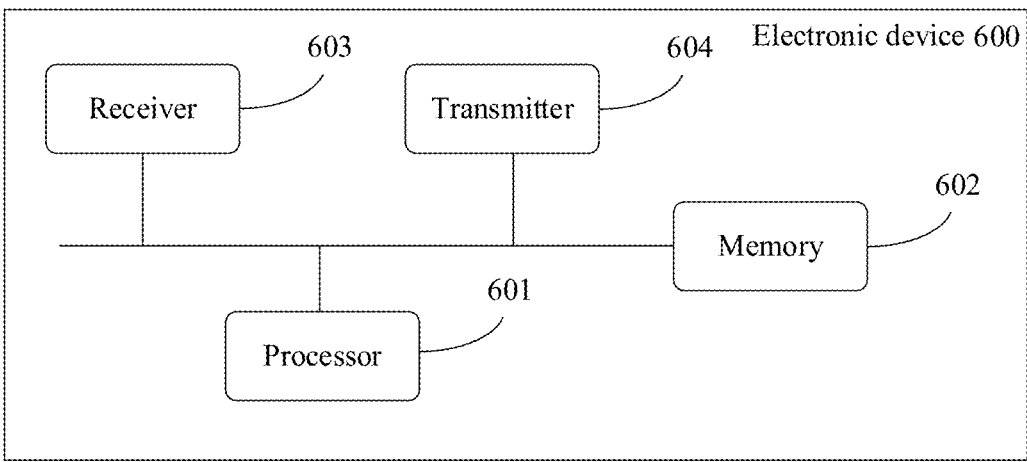
FIG. 8 is a block diagram of a structure of an electronic device according to an embodiment of the present disclosure.

FIG. 8 is a block diagram of a structure of an electronic device according to an embodiment of the present disclosure. The electronic device 600 includes a memory 602 and at least one processor 601.

The memory 602 stores computer-executable instructions.

The at least one processor 601 executes the computer-executable instructions stored in the memory 602, to cause the electronic device 600 to implement the method as described in FIG. 2 above.

In addition, the electronic device may further include a receiver 603 and a transmitter 604. The receiver 603 is configured to receive information from other apparatuses or devices and forward the information to the processor 601. The transmitter 604 is configured to transmit information to other apparatuses or devices.

In a first example of a first aspect, an embodiment of the present disclosure provides a data storage control method. The method includes:

constructing an equipment room allocation model for a distributed storage system based on a dependency relationship between storage objects in the distributed storage system, where the equipment room allocation model is used to output a corresponding migration evaluation result based on an equipment room allocation strategy, the equipment room allocation strategy is used to indicate a target equipment room allocated to the storage object in the distributed storage system, and the migration evaluation result is used to indicate overheads caused by data transition processing of migration from an original equipment room to the target equipment room for storage;

invoking the equipment room allocation model to determine, based on a migration evaluation result corresponding to each equipment room allocation strategy, an equipment room allocation strategy corresponding to a minimum migration evaluation result as a target equipment room allocation strategy; and performing data migration on the distributed storage system based on the target equipment room allocation strategy.

Based on the first example of the first aspect, in a second example of the first aspect, the migration evaluation result includes migration costs corresponding to the distributed storage system and corresponding cross-equipment room access traffic generated after equipment room allocation is performed based on the equipment room allocation strategy. The migration costs include total costs required for migrating the storage object in the distributed storage system from the original equipment room corresponding to the storage object to the target equipment room corresponding to the storage object in the equipment room allocation strategy for storage.

Based on the second example of the first aspect, in a third example of the first aspect, the storage object includes a data path and a computing task. The constructing an equipment room allocation model for a distributed storage system based on a dependency relationship between storage objects in the distributed storage system includes:

constructing a directed acyclic graph based on a dependency relationship between the data path and the computing task, where each node in the directed acyclic graph includes a data path and a computing task, and when the data path and the computing task are connected by an edge, a first edge weight of the edge is used to represent historical access traffic of the computing task to the data path; and constructing the equipment room allocation model by using the directed acyclic graph.

Based on the third example of the first aspect, in a fourth example of the first aspect, the migration costs are related to migration costs for a single storage object and a number of storage objects to be migrated, and the number of storage objects to be migrated is related to the original equipment room and the equipment room allocation strategy.

The cross-equipment room access traffic is related to a first edge weight corresponding to a cross-equipment room node group in the directed acyclic graph. The cross-equipment room node group includes a node where a computing task is located and a node where a data path is located in the directed acyclic graph, which are connected by an edge. The computing task and the data path in the cross-equipment room node group correspond to different target equipment rooms in the equipment room allocation strategy.

Based on the first to fourth examples of the first aspect, in a fifth example of the first aspect, the invoking the equipment room allocation model to determine, based on a migration evaluation result corresponding to each equipment room allocation strategy, an equipment room allocation strategy corresponding to a minimum migration evaluation result as a target equipment room allocation strategy includes:

determining, based on the equipment room allocation model under a preset constraint, the equipment room allocation strategy corresponding to the minimum migration evaluation result as the target equipment room allocation strategy, where the preset constraint includes: each storage object is allocated to one target equipment room, a total data amount of a storage object allocated to each target equipment room is less than or equal to a capacity of the target equipment room, and a number of storage objects allocated to each target equipment room is within a preset number range, where the preset number range includes a value range of a ratio of a number of storage objects to a number of equipment rooms in the distributed storage system.

Based on the fourth example of the first aspect, in a sixth example of the first aspect, the performing data migration on the distributed storage system based on the target equipment room allocation strategy includes:

determining a migration order based on the directed acyclic graph; and performing data migration on the distributed storage system based on the target equipment room allocation strategy, the original equipment room, and the migration order.

Based on the sixth example of the first aspect, in a seventh example of the first aspect, the determining a migration order based on the directed acyclic graph includes:

connecting an upstream node of a target node and a downstream node of the target node in the directed acyclic graph, to delete the target node from the directed acyclic graph to obtain a directed graph for migration; and determining the migration order based on the directed graph for migration.

Based on the seventh example of the first aspect, in an eighth example of the first aspect, the determining the migration order based on the directed graph for migration includes:

if the directed graph for migration includes a cyclic structure, determining, based on a first edge weight between the target node and each of the upstream node and the downstream node in the directed acyclic graph, a second edge weight of an edge between the upstream node and the downstream node in the directed graph for migration;

breaking an edge with a smallest second edge weight in the cyclic structure, to obtain a directed acyclic graph for migration; and determining the migration order based on a dependency relationship between nodes in the directed acyclic graph for migration.

Based on the seventh example of the first aspect, in a ninth example of the first aspect, the target node includes one of the following: a node where the computing task is located and a node where the data path is located.

In a first example of a second aspect, there is provided a data storage control apparatus. The apparatus includes:

a function construction module configured to construct an equipment room allocation model for a distributed storage system based on a dependency relationship between storage objects in the distributed storage system, where the equipment room allocation model is used to output a corresponding migration evaluation result based on an equipment room allocation strategy, the equipment room allocation strategy is used to indicate a target equipment room allocated to the storage object in the distributed storage system, and the migration evaluation result is used to indicate overheads caused by data transition processing of migration from an original equipment room to the target equipment room for storage;

a target strategy determining module configured to invoke the equipment room allocation model to determine, based on a migration evaluation result corresponding to each equipment room allocation strategy, an equipment room allocation strategy corresponding to a minimum migration evaluation result as a target equipment room allocation strategy; and a data migration module configured to perform data migration on the distributed storage system based on the target equipment room allocation strategy.

Based on the first example of the second aspect, in a second example of the second aspect, the migration evaluation result includes migration costs corresponding to the distributed storage system and corresponding cross-equipment room access traffic generated after equipment room allocation is performed based on the equipment room allocation strategy. The migration costs include total costs required for migrating the storage object in the distributed storage system from the original equipment room corresponding to the storage object to the target equipment room corresponding to the storage object in the equipment room allocation strategy for storage.

Based on the second example of the second aspect, in a third example of the second aspect, the storage object includes a data path and a computing task. The function construction module is further configured to:

construct a directed acyclic graph based on a dependency relationship between the data path and the computing task, where each node in the directed acyclic graph includes a data path and a computing task, and when the data path and the computing task are connected by an edge, a first edge weight of the edge is used to represent historical access traffic of the computing task to the data path; and construct the equipment room allocation model by using the directed acyclic graph.

Based on the third example of the second aspect, in a fourth example of the second aspect, the migration costs are related to migration costs for a single storage object and a number of storage objects to be migrated, and the number of storage objects to be migrated is related to the original equipment room and the equipment room allocation strategy.

The cross-equipment room access traffic is related to a first edge weight corresponding to a cross-equipment room node group in the directed acyclic graph. The cross-equipment room node group includes a node where a computing task is located and a node where a data path is located in the directed acyclic graph, which are connected by an edge. The computing task and the data path in the cross-equipment room node group correspond to different target equipment rooms in the equipment room allocation strategy.

Based on the first to fourth examples of the second aspect, in a fifth example of the second aspect, the target strategy determining module is further configured to:

determine, based on the equipment room allocation model under a preset constraint, the equipment room allocation strategy corresponding to the minimum migration evaluation result as the target equipment room allocation strategy, where the preset constraint includes: each storage object is allocated to one target equipment room, a total data amount of a storage object allocated to each target equipment room is less than or equal to a capacity of the target equipment room, and a number of storage objects allocated to each target equipment room is within a preset number range, where the preset number range includes a value range of a ratio of a number of storage objects to a number of equipment rooms in the distributed storage system.

Based on the fourth example of the second aspect, in a sixth example of the second aspect, the data migration module is further configured to:

determine a migration order based on the directed acyclic graph; and perform data migration on the distributed storage system based on the target equipment room allocation strategy, the original equipment room, and the migration order.

Based on the sixth example of the second aspect, in a seventh example of the second aspect, the data migration module is further configured to:

connect an upstream node of a target node and a downstream node of the target node in the directed acyclic graph, to delete the target node from the directed acyclic graph to obtain a directed graph for migration; and determine the migration order based on the directed graph for migration.

Based on the seventh example of the second aspect, in an eighth example of the second aspect, the data migration module is further configured to:

if the directed graph for migration includes a cyclic structure, determine, based on a first edge weight between the target node and each of the upstream node and the downstream node in the directed acyclic graph, a second edge weight of an edge between the upstream node and the downstream node in the directed graph for migration;

break an edge with a smallest second edge weight in the cyclic structure, to obtain a directed acyclic graph for migration; and determine the migration order based on a dependency relationship between nodes in the directed acyclic graph for migration.

Based on the seventh example of the second aspect, in a ninth example of the second aspect, the target node includes one of the following: a node where the computing task is located and a node where the data path is located.

According to a third aspect, one or more embodiments of the present disclosure provide an electronic device, including at least one processor and a memory.

The memory stores computer-executable instructions.

The at least one processor executes the computer-executable instructions stored in the memory, to cause the electronic device to implement the method of any one of the embodiments of the first aspect.

According to a fourth aspect, one or more embodiments of the present disclosure provide a computer-readable storage medium storing computer-executable instructions that, when executed by a processor, cause a computing device to implement the method of any one of the embodiments of the first aspect.

According to a fifth aspect, one or more embodiments of the present disclosure provide a computer program for implementing the method of any one of the embodiments of the first aspect.

The foregoing descriptions are merely preferred embodiments of the present disclosure and explanations of the applied technical principles. Persons skilled in the art should understand that the scope of disclosure involved in the present disclosure is not limited to the technical solutions formed by specific combinations of the foregoing technical features, and shall also cover other technical solutions formed by any combination of the foregoing technical features or equivalent features thereof without departing from the foregoing concept of disclosure. For example, a technical solution formed by a replacement of the foregoing features with technical features with similar functions disclosed in the present disclosure (but not limited thereto) also falls within the scope of the present disclosure.

In addition, although the various operations are depicted in a specific order, it should not be understood as requiring these operations to be performed in the specific order shown or in a sequential order. Under certain circumstances, multitasking and parallel processing may be advantageous. Similarly, although several specific implementation details are included in the foregoing discussions, these details should not be construed as limiting the scope of the present disclosure. Some features that are described in the context of separate embodiments can also be implemented in combination in a single embodiment. In contrast, various features described in the context of a single embodiment may alternatively be implemented in a plurality of embodiments individually or in any suitable subcombination.

Although the subject matter has been described in a language specific to structural features and/or logical actions of the method, it should be understood that the subject matter defined in the appended claims is not necessarily limited to the specific features or actions described above. In contrast, the specific features and actions described above are merely exemplary forms of implementing the claims.

The invention claimed is:

1. A data storage control method, wherein the method comprises:

constructing an equipment room allocation model for a distributed storage system based on a dependency relationship between storage objects in the distributed storage system, wherein the equipment room allocation model is used to output a corresponding migration evaluation result based on an equipment room allocation strategy, the equipment room allocation strategy is used to indicate a target equipment room allocated to the storage object in the distributed storage system, and the migration evaluation result is used to indicate overheads caused by data transition processing of migration from an original equipment room to the target equipment room for storage;

invoking the equipment room allocation model to determine, based on a migration evaluation result corresponding to each equipment room allocation strategy, an equipment room allocation strategy corresponding to a minimum migration evaluation result as a target equipment room allocation strategy; and performing data migration on the distributed storage system based on the target equipment room allocation strategy.

2. The method according to claim 1, wherein the migration evaluation result comprises migration costs corresponding to the distributed storage system and corresponding cross-equipment room access traffic generated after equipment room allocation is performed based on the equipment room allocation strategy, and the migration costs comprise total costs required for migrating the storage object in the distributed storage system from the original equipment room corresponding to the storage object to the target equipment room corresponding to the storage object in the equipment room allocation strategy for storage.

3. The method according to claim 2, wherein the storage object comprises a data path and a computing task, and the constructing an equipment room allocation model for a distributed storage system based on a dependency relationship between storage objects in the distributed storage system comprises:

constructing a directed acyclic graph based on a dependency relationship between the data path and the computing task, wherein each node in the directed acyclic graph comprises a data path and a computing task, and when the data path and the computing task are connected by an edge, a first edge weight of the edge is used to represent historical access traffic of the computing task to the data path; and constructing the equipment room allocation model by using the directed acyclic graph.

4. The method according to claim 3, wherein the migration costs are related to migration costs for a single storage object and a number of storage objects to be migrated, and the number of storage objects to be migrated is related to the original equipment room and the equipment room allocation strategy; and the cross-equipment room access traffic is related to a first edge weight corresponding to a cross-equipment room node group in the directed acyclic graph, the cross-equipment room node group comprises a node where a computing task is located and a node where a data path is located in the directed acyclic graph, which are connected by an edge, and the computing task and the data path in the cross-equipment room node group correspond to different target equipment rooms in the equipment room allocation strategy.

5. The method according to claim 4, wherein the invoking the equipment room allocation model to determine, based on a migration evaluation result corresponding to each equipment room allocation strategy, an equipment room allocation strategy corresponding to a minimum migration evaluation result as a target equipment room allocation strategy comprises:

determining, based on the equipment room allocation model under a preset constraint, the equipment room allocation strategy corresponding to the minimum migration evaluation result as the target equipment room allocation strategy, wherein the preset constraint comprises: each storage object is allocated to one target equipment room, a total data amount of a storage object allocated to each target equipment room is less than or equal to a capacity of the target equipment room, and a number of storage objects allocated to each target equipment room is within a preset number range, wherein the preset number range comprises a value range of a ratio of a number of storage objects to a number of equipment rooms in the distributed storage system.

6. The method according to claim 4, wherein the performing data migration on the distributed storage system based on the target equipment room allocation strategy comprises:

determining a migration order based on the directed acyclic graph; and performing data migration on the distributed storage system based on the target equipment room allocation strategy, the original equipment room, and the migration order.

7. The method according to claim 6, wherein the determining a migration order based on the directed acyclic graph comprises:

connecting an upstream node of a target node and a downstream node of the target node in the directed acyclic graph, to delete the target node from the directed acyclic graph to obtain a directed graph for migration; and determining the migration order based on the directed graph for migration.

8. The method according to claim 7, wherein the determining the migration order based on the directed graph for migration comprises:

if the directed graph for migration comprises a cyclic structure, determining, based on a first edge weight between the target node and each of the upstream node and the downstream node in the directed acyclic graph, a second edge weight of an edge between the upstream node and the downstream node in the directed graph for migration;

breaking an edge with a smallest second edge weight in the cyclic structure, to obtain a directed acyclic graph for migration; and determining the migration order based on a dependency relationship between nodes in the directed acyclic graph for migration.

9. The method according to claim 7, wherein the target node comprises one of the following: a node where the computing task is located and a node where the data path is located.

10. The method according to claim 3, wherein the invoking the equipment room allocation model to determine, based on a migration evaluation result corresponding to each equipment room allocation strategy, an equipment room allocation strategy corresponding to a minimum migration evaluation result as a target equipment room allocation strategy comprises:

determining, based on the equipment room allocation model under a preset constraint, the equipment room allocation strategy corresponding to the minimum migration evaluation result as the target equipment room allocation strategy, wherein the preset constraint comprises: each storage object is allocated to one target equipment room, a total data amount of a storage object allocated to each target equipment room is less than or equal to a capacity of the target equipment room, and a number of storage objects allocated to each target equipment room is within a preset number range, wherein the preset number range comprises a value range of a ratio of a number of storage objects to a number of equipment rooms in the distributed storage system.

11. The method according to claim 2, wherein the invoking the equipment room allocation model to determine, based on a migration evaluation result corresponding to each equipment room allocation strategy, an equipment room allocation strategy corresponding to a minimum migration evaluation result as a target equipment room allocation strategy comprises:

determining, based on the equipment room allocation model under a preset constraint, the equipment room allocation strategy corresponding to the minimum migration evaluation result as the target equipment room allocation strategy, wherein the preset constraint comprises: each storage object is allocated to one target equipment room, a total data amount of a storage object allocated to each target equipment room is less than or equal to a capacity of the target equipment room, and a number of storage objects allocated to each target equipment room is within a preset number range, wherein the preset number range comprises a value range of a ratio of a number of storage objects to a number of equipment rooms in the distributed storage system.

12. The method according to claim 1, wherein the invoking the equipment room allocation model to determine, based on a migration evaluation result corresponding to each equipment room allocation strategy, an equipment room allocation strategy corresponding to a minimum migration evaluation result as a target equipment room allocation strategy comprises:

determining, based on the equipment room allocation model under a preset constraint, the equipment room allocation strategy corresponding to the minimum migration evaluation result as the target equipment room allocation strategy, wherein the preset constraint comprises: each storage object is allocated to one target equipment room, a total data amount of a storage object allocated to each target equipment room is less than or equal to a capacity of the target equipment room, and a number of storage objects allocated to each target equipment room is within a preset number range, wherein the preset number range comprises a value range of a ratio of a number of storage objects to a number of equipment rooms in the distributed storage system.

13. An electronic device, comprising at least one processor and at least one memory, wherein the at least memory stores computer-executable instructions; and the at least one processor executes the computer-executable instructions stored in the at least one memory, to cause the electronic device to implement a data storage control method and the method comprises:

constructing an equipment room allocation model for a distributed storage system based on a dependency relationship between storage objects in the distributed storage system, wherein the equipment room allocation model is used to output a corresponding migration evaluation result based on an equipment room allocation strategy, the equipment room allocation strategy is used to indicate a target equipment room allocated to the storage object in the distributed storage system, and the migration evaluation result is used to indicate overheads caused by data transition processing of migration from an original equipment room to the target equipment room for storage;

invoking the equipment room allocation model to determine, based on a migration evaluation result corresponding to each equipment room allocation strategy, an equipment room allocation strategy corresponding to a minimum migration evaluation result as a target equipment room allocation strategy; and performing data migration on the distributed storage system based on the target equipment room allocation strategy.

14. The electronic device according to claim 13, wherein the migration evaluation result comprises migration costs corresponding to the distributed storage system and corresponding cross-equipment room access traffic generated after equipment room allocation is performed based on the equipment room allocation strategy, and the migration costs comprise total costs required for migrating the storage object in the distributed storage system from the original equipment room corresponding to the storage object to the target equipment room corresponding to the storage object in the equipment room allocation strategy for storage.

15. The electronic device according to claim 14, wherein the storage object comprises a data path and a computing task, and the constructing an equipment room allocation model for a distributed storage system based on a dependency relationship between storage objects in the distributed storage system comprises:

constructing a directed acyclic graph based on a dependency relationship between the data path and the computing task, wherein each node in the directed acyclic graph comprises a data path and a computing task, and when the data path and the computing task are connected by an edge, a first edge weight of the edge is used to represent historical access traffic of the computing task to the data path; and constructing the equipment room allocation model by using the directed acyclic graph.

16. The electronic device according to claim 15, wherein the migration costs are related to migration costs for a single storage object and a number of storage objects to be migrated, and the number of storage objects to be migrated is related to the original equipment room and the equipment room allocation strategy; and the cross-equipment room access traffic is related to a first edge weight corresponding to a cross-equipment room node group in the directed acyclic graph, the cross-equipment room node group comprises a node where a computing task is located and a node where a data path is located in the directed acyclic graph, which are connected by an edge, and the computing task and the data path in the cross-equipment room node group correspond to different target equipment rooms in the equipment room allocation strategy.

17. The electronic device according to claim 16, wherein the performing data migration on the distributed storage system based on the target equipment room allocation strategy comprises:

determining a migration order based on the directed acyclic graph; and performing data migration on the distributed storage system based on the target equipment room allocation strategy, the original equipment room, and the migration order.

18. The electronic device according to claim 17, wherein the determining a migration order based on the directed acyclic graph comprises:

connecting an upstream node of a target node and a downstream node of the target node in the directed acyclic graph, to delete the target node from the directed acyclic graph to obtain a directed graph for migration; and determining the migration order based on the directed graph for migration.

19. The electronic device according to claim 13, wherein the invoking the equipment room allocation model to determine, based on a migration evaluation result corresponding to each equipment room allocation strategy, an equipment room allocation strategy corresponding to a minimum migration evaluation result as a target equipment room allocation strategy comprises:

determining, based on the equipment room allocation model under a preset constraint, the equipment room allocation strategy corresponding to the minimum migration evaluation result as the target equipment room allocation strategy, wherein the preset constraint comprises: each storage object is allocated to one target equipment room, a total data amount of a storage object allocated to each target equipment room is less than or equal to a capacity of the target equipment room, and a number of storage objects allocated to each target equipment room is within a preset number range, wherein the preset number range comprises a value range of a ratio of a number of storage objects to a number of equipment rooms in the distributed storage system.

20. A non-transitory computer-readable storage medium, storing computer-executable instructions that, when executed by a processor, cause a computing device to implement a data storage control method, and the method comprising:

constructing an equipment room allocation model for a distributed storage system based on a dependency relationship between storage objects in the distributed storage system, wherein the equipment room allocation model is used to output a corresponding migration evaluation result based on an equipment room allocation strategy, the equipment room allocation strategy is used to indicate a target equipment room allocated to the storage object in the distributed storage system, and the migration evaluation result is used to indicate overheads caused by data transition processing of migration from an original equipment room to the target equipment room for storage;

invoking the equipment room allocation model to determine, based on a migration evaluation result corresponding to each equipment room allocation strategy, an equipment room allocation strategy corresponding to a minimum migration evaluation result as a target equipment room allocation strategy; and performing data migration on the distributed storage system based on the target equipment room allocation strategy.

* * * * *